United States Patent
Sibal et al.

(10) Patent No.: US 7,210,098 B2
(45) Date of Patent: Apr. 24, 2007

(54) TECHNIQUE FOR SYNCHRONIZING VISUAL AND VOICE BROWSERS TO ENABLE MULTI-MODAL BROWSING

(75) Inventors: Sandeep Sibal, Scotch Plains, NJ (US); Imran Bashir, Summit, NJ (US)

(73) Assignee: Kirusa, Inc., New Providence, NJ (US)

( * ) Notice: Subject to any disclaimer, the term of this patent is extended or adjusted under 35 U.S.C. 154(b) by 326 days.

(21) Appl. No.: 10/369,361

(22) Filed: Feb. 18, 2003

(65) Prior Publication Data

US 2003/0182622 A1    Sep. 25, 2003

Related U.S. Application Data

(60) Provisional application No. 60/357,924, filed on Feb. 18, 2002.

(51) Int. Cl.
  *G06F 15/00* (2006.01)
(52) U.S. Cl. .......... 715/513; 715/501.1; 715/530; 704/270.1
(58) Field of Classification Search .......... 715/513, 715/501.1, 522, 530, 738, 230; 704/275, 704/270, 270.1
See application file for complete search history.

(56) References Cited

U.S. PATENT DOCUMENTS

| | | | |
|---|---|---|---|
| 6,101,510 A | 8/2000 | Stone et al. | 707/513 |
| 6,282,511 B1* | 8/2001 | Mayer | 704/270 |
| 6,349,132 B1* | 2/2002 | Wesemann et al. | 379/88.17 |
| 6,490,603 B1 | 12/2002 | Keenan et al. | 707/513 |
| 6,594,348 B1* | 7/2003 | Bjurstrom et al. | 379/88.13 |
| 6,766,298 B1* | 7/2004 | Dodrill et al. | 704/270.1 |
| 2003/0071833 A1 | 4/2003 | Dantzig et al. | 345/700 |
| 2003/0187656 A1* | 10/2003 | Goose et al. | 704/270.1 |
| 2003/0208472 A1* | 11/2003 | Pham | 707/2 |
| 2004/0006474 A1* | 1/2004 | Gong et al. | 704/270.1 |

OTHER PUBLICATIONS

Kennedy et al., "HTML The Definitive Guide", copyright 1998, pp. 211-215.*

* cited by examiner

*Primary Examiner*—Thu V. Huynh
(74) *Attorney, Agent, or Firm*—Ash Tankha of Counsel, Lipton, Weinberger & Husick (57) ABSTRACT

A system and method for interacting with content, such as web-based markup content, using visual and voice browsers. A first browser facilitates communication in a first mode (e.g., an HTML browser that facilitates visual/tactile interaction with HTML content), and a second browser facilitates communication in a second mode (e.g., a VXML browser that facilitates audio interaction with VXML content). HTML and VXML content is created that: (1) indicates a correspondence between HTML and VXML pages that represent the same underlying content; and (2) contains specialized tags that indicate information to be send from one browser to the other to synchronize each browser to equivalent parts of the content. The HTML browser is adapted to use relative links as signals that information is to be sent to the VXML browser, and the platform on which the VXML browser runs is adapted to recognize a "hit" on its own port 80 as a signal that information is to be sent to the HTML browser.

11 Claims, 7 Drawing Sheets

```
<HTML>
<HEAD>
<TITLE>Foo Mail</TITLE>
<META http-equiv="vxml_url"
      content="http://foo.com/foo.vxml">
</HEAD>
<BODY>
<a name="kirusaglobal" href="#_kirusa_#kirusaglobal"></a>
<TABLE>
<TBODY>
<TR>
<TD><A href="index.html"><IMG src="red-yicon.gif" border=no></A> </TD></TR>
<TR>
<TD><A href="mail.html"><IMG height=16 src="mail.gif" width=16 border=0></A><B>Mail</B>
<TD></TD></TR></TBODY></TABLE>
<FORM name="signin" action=http://wap.oa.foo.com/raw?dp=login&src=mail1 method=post>
Foo ID:<BR>
<INPUT size=18 name=login onFocus="window.navigate('#_kirusa_#idform');"><BR><BR>
Password:<BR>
<INPUT type=password size=18 name=passwd><BR><BR>
<INPUT type=submit value="Sign in"> <INPUT type=hidden
       value=%deviceid name=pdadid>
</FORM>

<CENTER><BR><A
href="index.html">Foo Home</A>
</CENTER>
<CENTER>
<HR SIZE=1>
<SMALL>Copyright Foo.com
<BR>All rights reserved.<BR></SMALL></CENTER>
</BODY>
</HTML>
```

```
<?xml version="1.0"?>
<vxml version="1.0">
<menu id="kirusaglobal">
<prompt timeout="20000"></prompt>
<choice next="#signinform">Sign In</choice>
</menu>                                                                          302

<form id="signinform">
<block><prompt>Signing in</prompt>                                               304
<assign name="___KIRUSA_SUBMIT_FORM____" expr="'signin'"/>                       306
<submit next="http://localhost:8082/" namelist="___KIRUSA_SUBMIT_FORM____"/>
</block>
</form>

<form id="idform">                                                               308
<field name="yahooid">
<prompt timeout="200000">Yahoo ID</prompt>
<option value="ctokirusa">CTO</option>
<option value="imran_bashir_00">Imran</option>
<filled><prompt></prompt>
<assign name="___KIRUSA_OBJECT_PROPERTY___" expr="'document.forms[0].login.value'"/>    310
<assign name="___KIRUSA_OBJECT_VALUE___" expr="'yahooid'"/>                             312
<assign name="___KIRUSA_LINK_NAVIGATE___" expr="'kirusaglobal'"/>                       314
<assign name="___KIRUSA_SET_FOCUS___" expr="'document.forms[0].passwd'"/>               316
</filled></field>
<block>
<submit next="http://localhost:8082/" namelist="___KIRUSA_OBJECT_PROPERTY___ ___KIRUSA_OBJECT_VALUE___   318
   ___KIRUSA_LINK_NAVIGATE___  ___KIRUSA_SET_FOCUS___"/>
</block>
</form>
</vxml>
```

TECHNIQUE FOR SYNCHRONIZING VISUAL AND VOICE BROWSERS TO ENABLE MULTI-MODAL BROWSING

CROSS-REFERENCE TO RELATED CASES

This application claims the benefit of U.S. Provisional Application No. 60/357,924, entitled "A Technique for Synchronizing Visual and Voice Browsers to Enable Multi-Modal Browsing," filed on Feb. 18, 2002.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the field of computer-based communications, and, more particularly, a system and method for interacting with content through the concurrent use of visual and voice browsers.

BACKGROUND OF THE INVENTION

Typical interaction with content, such as web content, takes place in only one browser at a time. For example, a user may interact with a web site by downloading an Hypertext Markup Language (HTML) page and using a visual browser to interact with the content represented by the page (i.e., "visual/tactile" mode), or may request the same content in the form of a Voice eXtensible Markup Language (VXML) page, and may use a voice browser to interact with that content (i.e., "voice" or "audio" mode). The disadvantage of this arrangement is that the user can generally interact with the content in only one mode at a time. For example, if the user downloads the HTML version of a portal site's home page, the user cannot then speak the word "mail" to be taken to the portal's mail service. The user must select a link to the mail service using a mouse, stylus, keyboard, etc.

It would be advantageous if a user could use both browsers to interact with content simultaneously—e.g., if the user could say the word "mail" to be taken to the mail service, and then enter the user's ID and password using a keyboard. Moreover, it would be further advantageous if such a system could be implemented using existing browsers and markup languages, or only minor extensions thereto.

In view of the foregoing, there is a need for a system that overcomes the drawbacks of the prior art.

SUMMARY OF THE INVENTION

The present invention provides a technique for enabling a multi-modal browser by synchronizing visual and voice browsers. The present invention has the advantage that it can be implemented using existing browser technology with only minor modifications. Moreover, content can be adapted to work with the present invention by the mere inclusion of certain types of tags, which allow a properly-configured browser to work with the multi-modal features of the content, while not interfering with the operation of a conventional browser that is not "multi-modal aware."

In accordance with the invention, content is provided in two markup languages. Hypertext Markup Language (HTML) and Voice eXtensible Markup Language (VXML) are exemplary of markup languages that facilitate two modes of communication, although these examples are not intended to be exhaustive. The HTML content contains a special tag that identifies the VXML page that corresponds to the HTML content. For example, an HTML page called "http://www.foo.com/foo.html" may contain a tag that identifies as its corresponding VXML page. The VXML page may "http://www.foo.com/foo.vxml" (all hyperlinks in this application are not intended to be active hyperlinks) as its corresponding VXML page. The VXML page may likewise reference back to a corresponding HTML page. Additionally, each page contains: (1) information and/or instructions that are to be communicated to the corresponding page's browser (e.g., the HTML page contains information and/or instructions to be communicated to the voice browser that renders VXML content, and vice versa); and (2) signals that cause this information to be communicated. Thus, the HTML browser can inform the VXML browser what types of interaction has taken place in visual/tactile mode, so that the VXML browser can be synchronized to an appropriate point on the VXML page. The reverse is also true: the VXML browser can inform the HTML browser about events that have taken place in voice or audio mode.

In a preferred embodiment of the invention, an HTML viewer reads and parses the HTML content as it is encountered, and this HTML viewer upon the triggering of relative links within the HTML content exports a "navigate" event that is trapped. Relative links having a certain format signal to the multi-modal manager that information is to be communicated to the VXML browser. Similarly, the VXML browser is adapted to run on a computer that has been configured to recognize a "hit" on a certain.port as a signal that information should be sent from the VXML browser to the HTML browser via the multi-modal manager. Thus, the use of a multi-modal manager, and the adaptation of a computer to respond appropriately to a "hit" on a certain port, allows the HTML and VXML browsers to send messages to each other on demand.

Other features of the invention are described below.

BRIEF DESCRIPTION OF THE DRAWINGS

The foregoing summary, as well as the following detailed description, is better understood when read in conjunction with the appended drawings. For the purpose of illustrating the invention, like references numerals represent similar parts throughout the several views of the drawings, it being understood, however, that the invention is not limited to the specific methods and instrumentalities disclosed. In the drawings.

DETAILED DESCRIPTION OF THE INVENTION

The present invention provides a technique for interacting with interacting with information content in visual and voice modes. Voice mode may comprise "audio" or "voice interaction (where the user hears content with a speaker and inputs content by speaking into a microphone), and "visual" mode may comprise "visual/tactile" interaction (where the user sees content on the screen and inputs content by using a tactile device such as a stylus, keyboard, mouse, etc.).

Exemplary Architecture for Multi-Modal Content Interaction

Figure 1:
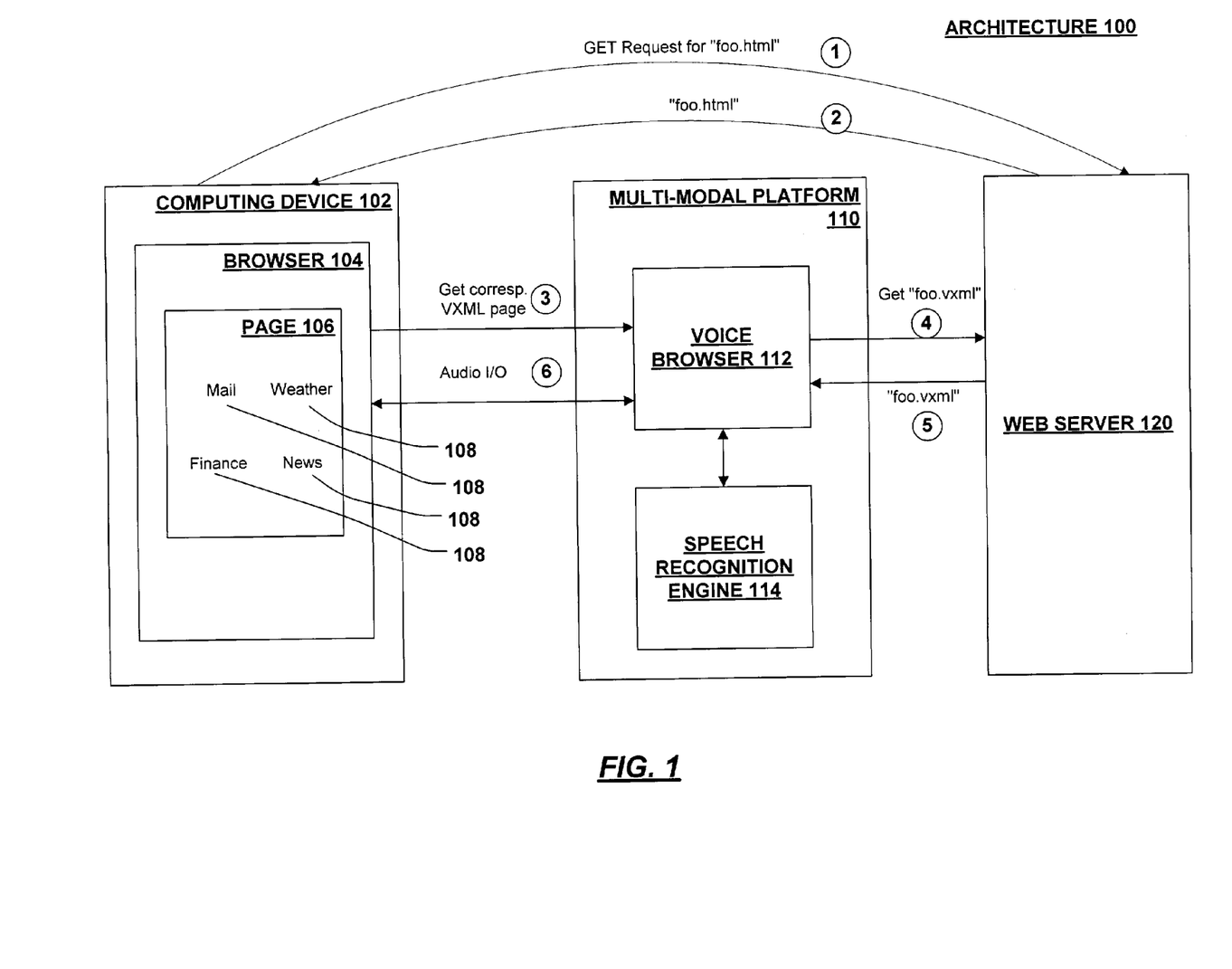
FIG. 1 is a block diagram of an exemplary architecture in which aspects of the invention may be implemented.

FIG. 1 shows an exemplary architecture 100 for interacting with content in a multi-modal fashion. Architecture 100 comprises a computer device 102. Computer device 102 may be any type of device that possesses some computing capability—e.g., a handheld computer, a desktop computer, a wireless telephone, a wired telephone, etc. Computing device 102 has various types of input/output (I/O) devices (not shown); the following is a non-exhaustive list of exemplary I/O devices that may be present on computing device 102: a Liquid Crystal Display (LCD); a keypad and/or keyboard; a stylus-operated touch screen; a microphone. These I/O devices may be characterized according to the nature of the information that they are adapted to work with. For example, the microphone and speaker may be characterized as audio devices; the LCD may be characterized as a visual device; the keyboard/keypad may be characterized as a tactile input device; a stylus-operated touch screen may be characterized as both visual and tactile devices.

Computing device 102 executes browser 104. Browser 104 is a software application that is adapted to render markup content, such as a web page 106 written in Hypertext Markup Language (HTML). In the example of FIG. 1, web page 106 contains links 108, which may direct the user to other pages, or to specific places within web page 106. Browser 104 also permits allows the user to interact with web page 106—e.g., by allowing the user to fill in forms appearing on web page 106, follow links referenced on web page 106, etc.

Multi-modal platform 110 is a computing device that is communicatively coupled to computer device 102. Typically, multi-modal platform 110 is powerful computing hardware of the type typically called a "server." It should be understood that "server," in this context, is an informally descriptive label that refers to the relative size and capabilities of the hardware that embodies multi-modal platform 110, rather than to multi-modal platform 110's role within a particular network topology. Multi-modal platform may fulfill the role of a server in a client/server topology, but may, alternatively, function as a peer in a peer-to-peer topology.

Voice browser 112 and speech recognition engine 114 execute on multi-modal platform 110. Voice browser 112 is a software application that is adapted to render markup context, such as Voice extensible Markup Language (VXML) content. Speech recognition engine 114 processes raw audio data and generates tokens or messages based on the raw data. For example, speech recognition engine 114 may receive a raw digital or analog audio signal and determine that the signal, as a whole, should be interpreted as the word "hello." 1 the example of FIG. 1, voice browser 112 and speech recognition engine 114 are separate components that communicate with each other, although in an alternative embodiment a single component may perform both the functions of a voice browser and a speech recognition engine.

Web server 120 is a computing device that is communicatively connected to multi-modal platform 110 and to computing device 102. Web server 120 stores and/or generates markup content. For example, web server 120 may be used to service an Internet portal site that provides a search engine, an E-mail server, weather reports, etc. Web server 120 typically contains a combination of software and stored data, and uses both the software and stored data to generate markup content dynamically. Alternatively, web server 120 may simply serve up static markup content that is stored on web server 120, although it will be observed that as of the time of this disclosure (the year 2002), web servers that generate markup content dynamically are the norm, whereas web servers that merely serve static content are becoming increasingly uncommon.

Web server 120 is preferably capable of generating and/or serving content in various markup formats. For example, web server 120 may store and/or generate content in HTML, and may also store and/or generate VXML content that corresponds to the HTML content. For example, in FIG. 1 web page 106 is a portal page that allows the user to link to "mail," "finance," "news," or "weather." This portal content can be represented as visually-renderale HTML (as is shown in FIG. 1), but may also be represented in audibly-renderable VXML—e.g., by creating a VXML page that causes voice browser 112 to speak the choices "mail," "finance," etc. The nature of the correspondence between an HTML page and a VXML page is discussed in greater detail below in connection with FIGS. 2–3.

In the example of FIG. 1, web server 120 is shown as a separate device from multi-modal platform 110. However, the functionality of web server 120 and multi-modal platform 110 may be performed on the same device. For example, one may create a portable "demonstration" of architecture 110 by installing, on a single laptop computer, software that functions as both web server 120 and multi-modal platform 110, and by allowing the laptop to communicate with computing device 102 through a wireless local area network (LAN).

The following is a description of how a user may use computing device 102 to interact multi-modally with content served by web server 120. Initially (step 1, indicated by the circled "1"), the user uses browser 104 to issue a "GET" request for a web page. As is known in the art, a GET request is one type of request that can be made according to the HTTP protocol. In the example of FIG. 1, the user requests the page "foo.html" from web server 120. (Assume, for the purpose of this example, that web server 120 implements the web site www.foo.com, whose home page is foo.html.) This GET request may, optionally, be initiated by the mere fact that the user has started browser 104—i.e., foo.html may be registered as the user's home page. It should be noted that FIG. 1 depicts the initial request as being for the HTML page (as opposed to a similar VXML page), although it will be understood that the initial request could just as well be for a VXML page.

At step 2, the web server sends the page foo.html to computing device 102 in response to the GET request, whereupon it is rendered by browser 104. As is known in the art, foo.html may contain non-printing content—i.e., content that is not meant to be rendered by browser 104, but which causes browser 104 to take some action when this non-printing content is encountered. In this case, the page foo.html contains a tag that identifies the VXML page that corresponds to foo.html. The nature of this tag is described below in connection with FIG. 2. In the example of FIG. 1, the corresponding VXML page is called foo.vxml. "Corresponding" in this case means that foo.vxml contains voice content that is similar to foo.html—e.g., foo.vxml may audibly speak the names of links that are displayed visually in foo.html. However, there are no formal requirements as to what constitutes such a correspondence, and the decision as to what VXML content "corresponds" to a particular piece of HTML content is appropriately left to the content designer.

Figure 4:
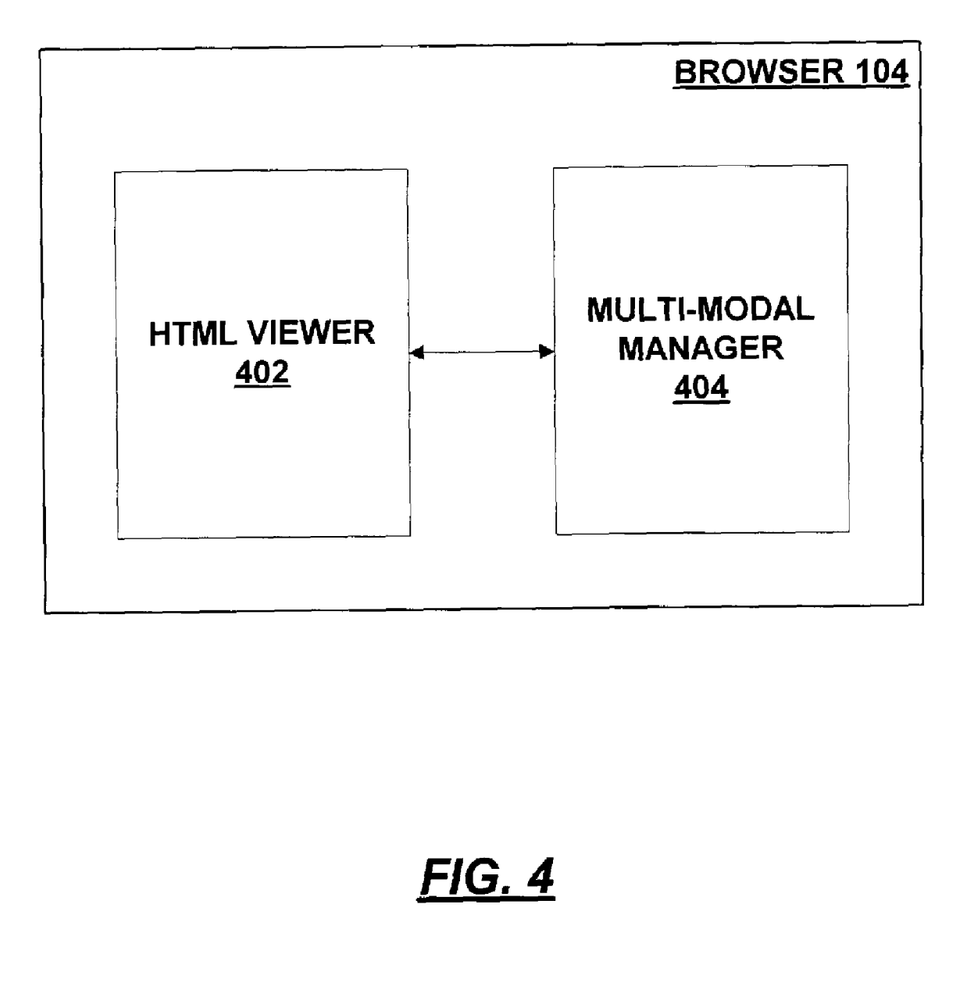
FIG. 4 is a block diagram of an exemplary browser that has been adapted for multi-modal use.

At step 3, computing device 102 instructs voice browser 112 to issue a request for foo.vxml, since foo.vxml is the page that foo.html has identified as its corresponding VXML page. FIG. 4 (below) describes a technique whereby computing device 102 may be configured to instruct voice browser 112 to take such action based on a tag contained in foo.html. At step 4, voice browser 112 issues a GET request to web server 120 to obtain foo.vxml. At step 5, web server 120 provides foo.vxml to voice browser 112. At step 6, voice browser 112 renders foo.vxml. This rendering typically comprises sending an audio signal to computing device 102, whereupon computing device 102 plays the audio through its speaker.

It will be observed that, in the example of FIG. 1, computing device 102 receives visual markup content (i.e., foo.html) and uses browser 104 to render the markup, but merely acts as a "dumb" speaker with respect to the audio content that is synthesized by multi-modal platform 110. This configuration is typical, since computing device 102 may be a small device such as a handheld computer or wireless telephone that can perform the relatively simple computations involved in rendering HTML but lacks sufficient power to perform computationally intensive operations such as speech synthesis. However, the exemplary configuration shown in FIG. 1 is not mandatory; if computing device 102 has sufficient processing power, then computing device 102 may have its own voice browser and may performs speech synthesis based on VXML content rather than acting as a mere speaker for audio signals that have been generated elsewhere.

Synchronization Between Voice and Visual Browsers

The invention provides a technique whereby visual browser 104 and voice browser 112 may be "synchronized" with respect to corresponding HTML and VXML pages. For example, if a user has used the visual browser to navigate to a particular HTML page, it is possible to "synchronize" the voice browser by pointing the voice browser to the "corresponding" VXML page, as described above. Furthermore, if the user is focused on some aspect of the HTML page (e.g., has placed the cursor inside a particular field of a form on the HTML page), it is possible to further synchronize the voice browser in the sense of pointing the voice browser to a dialog on the VXML page that corresponds to that field (e.g., by rendering an audio prompt for the user to enter the data associated with the field in which the visual cursor is located). Other types of synchronization are possible, including, but not limited to: synchronizing field inputs between voice and visual browsers so that a user can fill out different fields of a single form using a combination of both voice and visual/tactile mode (e.g., in an address form, typing the city "New York" and speaking the zip code "10001"); synchronizing partial field inputs so that a user can fill out a single field using a combination of voice and visual/tactile input (e.g., entering a city name by typing "New" followed by speaking "York"), etc.

The level of detail in the synchronization can be referred to as the "granularity"; synchronizing at the "page" level (i.e., ensuring that corresponding HTML and VXML pages are loaded in the visual and voice browsers, but without regard to what the user is doing on each page) is a fairly "coarse" granularity of synchronization; synchronizing to the point of allowing a user to type "New" and speak "York" in the same field represents a relatively "fine" granularity. In the examples that follow, the granularity of synchronization shown includes: (1) placing the visual and voice browsers on the corresponding HTML and VXML pages; (2) placing the visual and voice browsers at equivalent dialogues within their corresponding pages; and (3) updating field inputs such that if a field data is entered on one of the pages (e.g., in the VXML page), the same data is automatically entered into the corresponding field on the HTML page. However, it will be understood that this level of granularity, demonstrated below, is merely exemplary, and that similar techniques may be used to achieve any level of granularity in the synchronization, and the invention is not limited to the level of granularity demonstrated.

Figure 2:
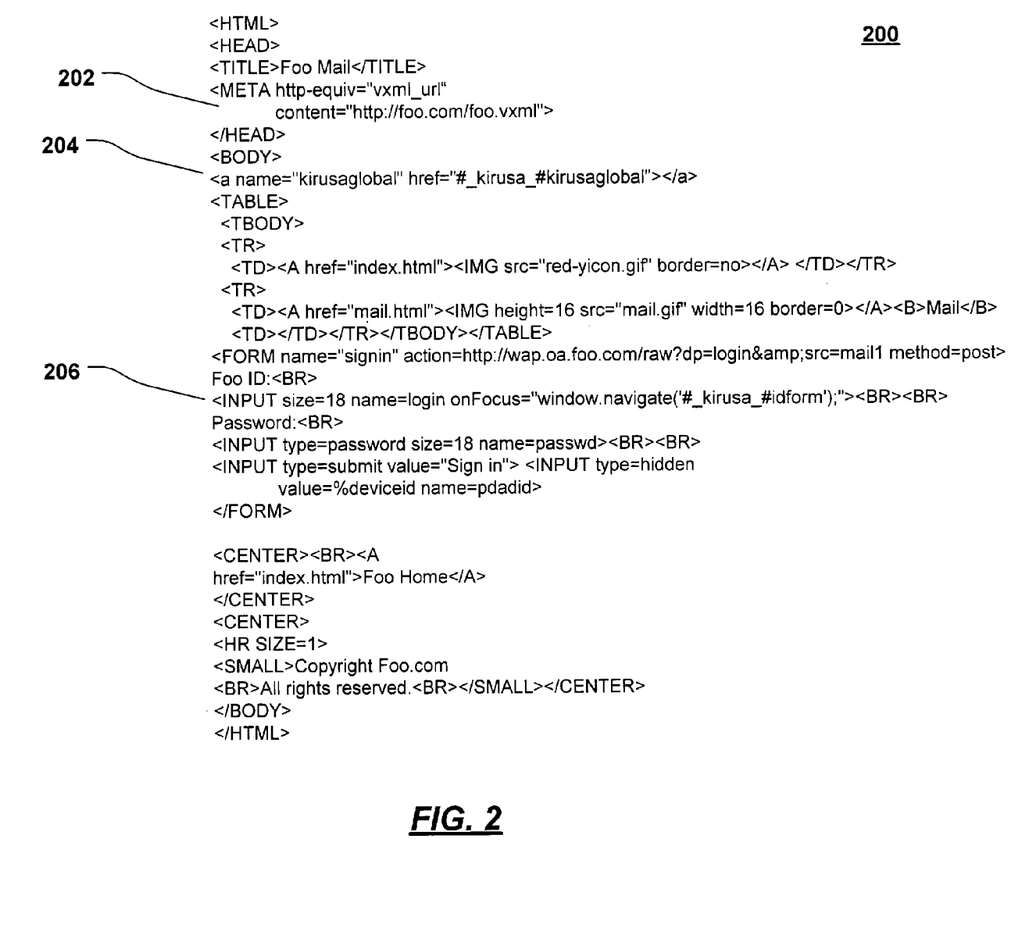
FIG. 2 is a diagram of exemplary visual markup content that has been adapted for multi-modal use.

As noted above, the synchronization technique of the present invention make use of non-printing (or, in the case of voice content, non-spoken) information embedded in markup content. FIG. 2 shows an example of an HTML page that has been adapted for multi-modal use through the inclusion of such content. HTML page 200 includes, among other things, a tag 202 that identifies the VXML page that is equivalent to HTML page 200. In this example, the equivalent VXML page is http://foo.com/foo.vxml. HTML page 200 also includes, among other things, a tag 204 that serves two functions: First, tag 204 contains the statement name="kirusaglobal". This statement assigns the label "kirusaglobal" to the particular point in the page at which the tag appears (roughly the beginning of the page in this example). Second, tag 204 contains the statement href="#_kirusa_#kirusaglobal." This statement attempts to jump to a point in HTML page 200 labeled "_kirusa_#kirusaglobal." In the example of FIG. 2, there is no such label on page 200; however, the attempt to jump to that point can be intercepted by an HTML viewer (discussed below), which can then use that information for synchronization. In particular, the HTML viewer can be configured to recognize certain references (e.g., those beginning with the string "_kirusa_"), and can also be configured to instruct the voice browser to jump to the label identified by whatever follows "_kirusa_" on whatever VXML page corresponds to HTML page 200. Thus, in this example, the attempt to jump to the non-existent reference "#_kirusa_#kirusaglobal" is actually a signal to an appropriately-configured HTML viewer (discussed below) to instruct a voice browser to jump to the label "kirusaglobal" on a corresponding VXML page. (It should be understood that a relative link does not have to refer to a non-existent label in order to actuate the HTML viewer. Any relative link causes the HTML viewer to take action. However, when an HTML viewer attempts to jump to a non-existent label, the result is that no movement occurs on the page. Thus, the technique of using relative links to non-existent labels serves to incite the HTML viewer into action while making it appear to the user as if nothing has happened.)

Tag 206 is another tag containing information that helps to synchronize the voice browser to the state of the visual browser. Tag 206 defines an input field named "login" in the form called "signin". Additionally, tag 206 contains the statement onFocus="window.navigate('#_kirusa_#idform');
", which specifies that if the user "focuses" on the field named "login" (i.e., points the cursor to that field using the visual browser), then the HTML viewer is instructed to execute a jump to the label "#_kirusa_#idform" in HTML page 200. As was the case with the label described above in connection with tag 204, the label "#_kirusa_#idform" does not exist in page 200, but an appropriately-configured HTML viewer can recognize the label (based on the fact that it begins with the string "_kirusa_") and uses the information contained in the label to instruct the voice browser to jump someplace—in this case, the voice browser will be instructed to jump to the label "idform" on the corresponding VXML page.

Thus, the tags on HTML page 200 facilitate synchronization between a visual browser and a voice browser in the following ways: (1) tag 202 identifies the VXML page that corresponds to HTML page 200; (2) tag 204 contains a relative link to a non-existent label on HTML page 200 that can be trapped by an appropriate HTML viewer and used to instruct the voice browser to perform an action; and (3) tag 206 contains an instruction to jump to a non-existent relative link whenever the user points the cursor at a particular field, where, again, the non-existent link is trapped by an appropriate HTML viewer and used to instruct the voice browser. It will be understood that the technique of jumping to non-existent relative links, coupled with an appropriate HTML viewer that uses these links as a basis for instructing a voice browser, can be generalized to an arbitrary level of granularity. By including additional relative links at appropriate places, the HTML viewer may be used to provide more information and instructions to the voice browser, thereby facilitating synchronization at a finer level of granularity than that which is depicted.

Figure 3:
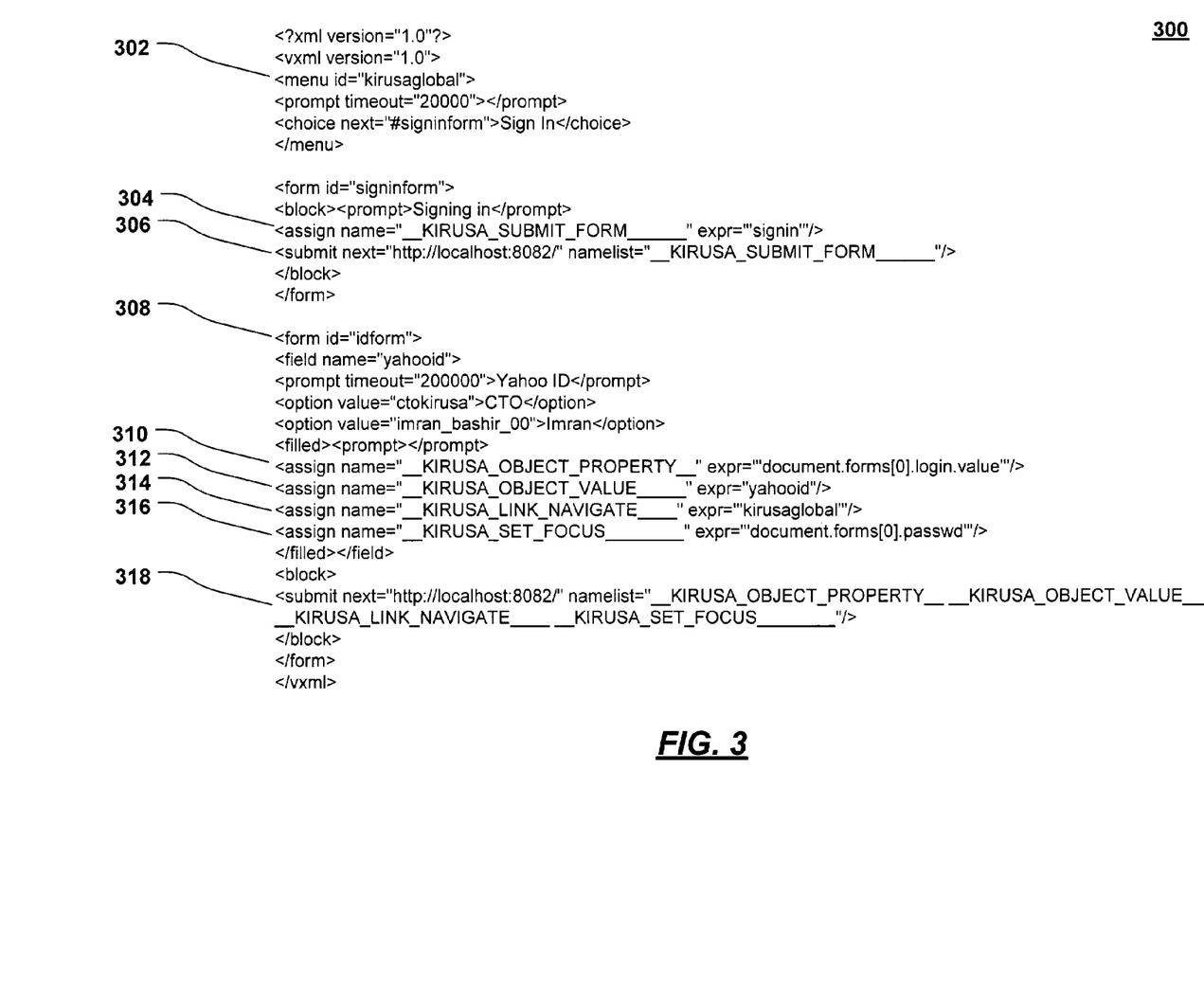
FIG. 3 is a diagram of exemplary audio markup content that has been adapted for multi-modal use.

FIG. 3 shows a VXML page 300. Page 300 is, in this example, the page "foo.vxml" that is identified in tag 292 as being HTML page 200's corresponding VXML page. VXML page 300 contains various tags 302–316 that facilitate multi-modal use of the content that is collectively represented by HTML page 200 and VXML page 300.

Tag 302 identifies a particular point in VXML page 300 by the label "kirusaglobal." It will be recalled from the discussion of FIG. 2 that HTML page 200 may cause a voice browser to jump to the label "kirusaglobal," and tag 302 identifies the place on page 300 to which such a jump refers. Similarly, tag 308 is the "idform" label that the voice browse will be instructed to jump to when the user focuses on the login field in HTML page 200 (see discussion of tag 206 above).

Tags 304 and 306 collectively contain: (1) information to be sent to a visual browser, and (2) an instruction that causes that information to be send to the visual browser. Specifically, tag 304 contains an instruction to assign the expression "'signin'" to the label named "_KIRUSA_SUBMIT_FORM_", and tag 306 contains an instruction that, in effect, causes the label "_KIURSA_SUBMIT_FORM_" and its assigned value to be sent to the visual browser. The technique embodied in tag 306 is as follows: tag 306 contains an instruction to navigate to the URL http://localhost:8082. As will be recognized by those of skill in the art, this URL refers to port 8082 on the machine on which the request originates. The machine that runs the voice browser (i.e., multi-modal platform 110, shown in FIG. 1) may be configured to recognize a "hit" on its own port 8082 as a signal to send information to the visual browser—e.g., to send the visual browser a Java script that is to be run on the visual browser. Thus, tag 306 causes voice browser to construct a GET request to its own URL, on port 8082, including a list of labels (which, in this case, includes only the label "_KIRUSA_SUBMIT_FORM_"). When the multi-modal platform receives such a "hit" on its own port 8082, it interprets this to mean "send the Java scripts contained in the identified labels to the voice browser and instruct the voice browser to execute those scripts." Thus, tag 306 causes the "expression" assigned to the label "_KIRUSA_SUBMIT_FORM_" to be sent to the visual browser and executed by the visual browser's script engine. In the case of tags 304 and 306, the instruction that results from these tags is, in essence, to point the visual browser to the "signin" form on HTML page 200.

Tags 310–318 set up a similar synchronization scheme. Tags 310 and 312 collectively specify that the field identified by "document.forms[0].login.value" on HTML page 200 is to be set to the whatever value "fooid" receives on VXML page 300. (Other code in VXML page 300 causes the voice browser to render an audio prompt for this value and to set the variable "fooid" to the input received from the user.) Tag 314 indicates that the visual browser should navigate to the tag "kirusaglobal" on HTML page 200. Tag 316 indicates that the visual browser should be instructed to set its focus (i.e., point its cursor) to the password field in the "zero-ith" form on HTML page 200 (which, in the example of FIG. 2, is the "signin" form). Tag 318 causes multi-modal platform to send the information and instructions created in tags 310, 312, 314, and 316 to the visual browser, using the technique discussed above in connection with tag 306.

Configuration of the Computing Device 102 for Multi-Modal Browsing

Computing device 102 typically comes with a browser. For example, computing device 102 may be a PDA that comes with a browser such as INTERNET EXPLORER. Browsers, such as INTERNET EXPLORER, have various components. One of these components is a Component Object Model (COM) object called an HTML viewer. FIG. 4 depicts browser 104 as comprising, among other things, an HTML viewer 402 and a multi-modal manager 404. It will be understood that FIG. 4 is not an exhaustive depiction of the components of browser 104, but shows the components that are discussed herein.

As noted above, HTML viewer 402 is preferably a COM object that can interface with other objects. HTML viewer parses HTML content, moves around an HTML page based on what is encountered, and calls upon another object to perform actions when certain HTML control structures are encountered. For example, if a relative link is encountered within an HTML document, HTML viewer 402 moves to the place identified by the relative link (or, more precisely, attempts to move to such a place; no movement within the page will take place if the referenced relative link does not exist). Additionally, HTML viewer 402 is configured to call upon another object whenever a relative link is encountered. A commercially-available browser typically comes with its own object(s) that interface with HTML viewer 402 and that behave in a standard way. However, such objects are not adapted for multi-modal browsing.

The invention exploits the feature of HTML viewer 402 that causes an object external to HTML viewer 402 to be invoked whenever HTML viewer 402 encounters a relative link. The invention provides a multi-modal manager 404, which is an object that interfaces with HTML viewer 402. Multi-modal manager 404 stands in place of the standard object that is provided with a commercially-available browser to interface with HTML viewer 402. In particular, multi-modal manager 404 is designed to process relative link events by doing the following: (1) parsing the label to which HTML viewer 402 is attempting to jump to identify those labels that have special meaning (in the above example, such labels were identified because they being with "_kirusa_"); (2) using the information contained in the label to instruct the voice browser to take some action. In the example above, whatever follows "_kirusa_" in a relative link is interpreted as an actual label that appears on a VXML page, and multi-modal manager instructs the voice browser to jump to that label on the VXML page. As discussed above, an HTML viewer can be adapted to use relative links to send instructions to a voice browser. The use of multi-modal manager 404, having the functionality described above, to interface with the HTML viewer 402 COM object provides this adaptation, by allowing a relative link within an HTML document to have the effect of signaling that some information must be sent to a voice browser.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto and changes may be made without departing from the scope and spirit of the invention in its aspects.

Appendix

Figure 5:
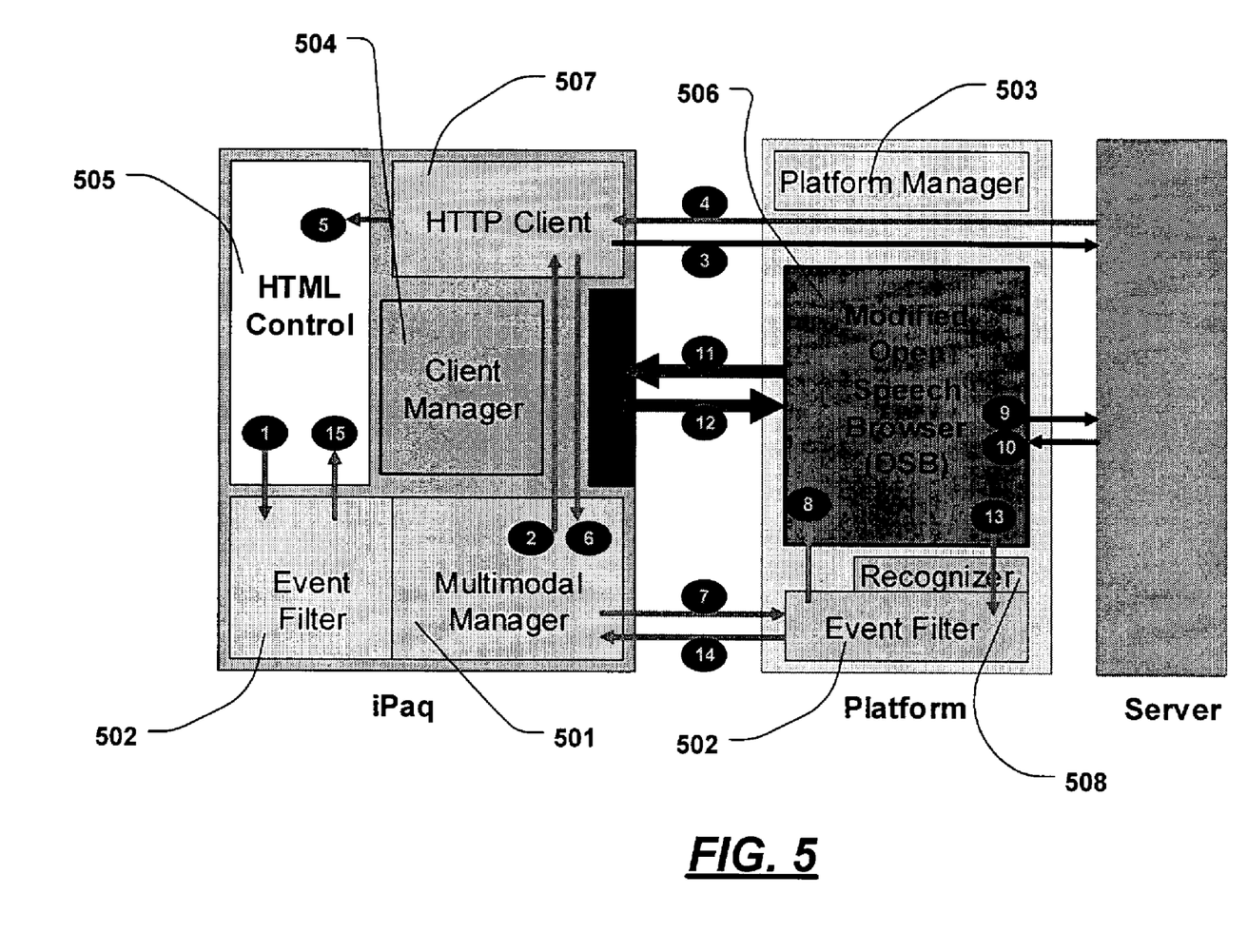
FIG. 5 is a block diagram of a first exemplary architecture according to aspects of the invention.
Figure 6:
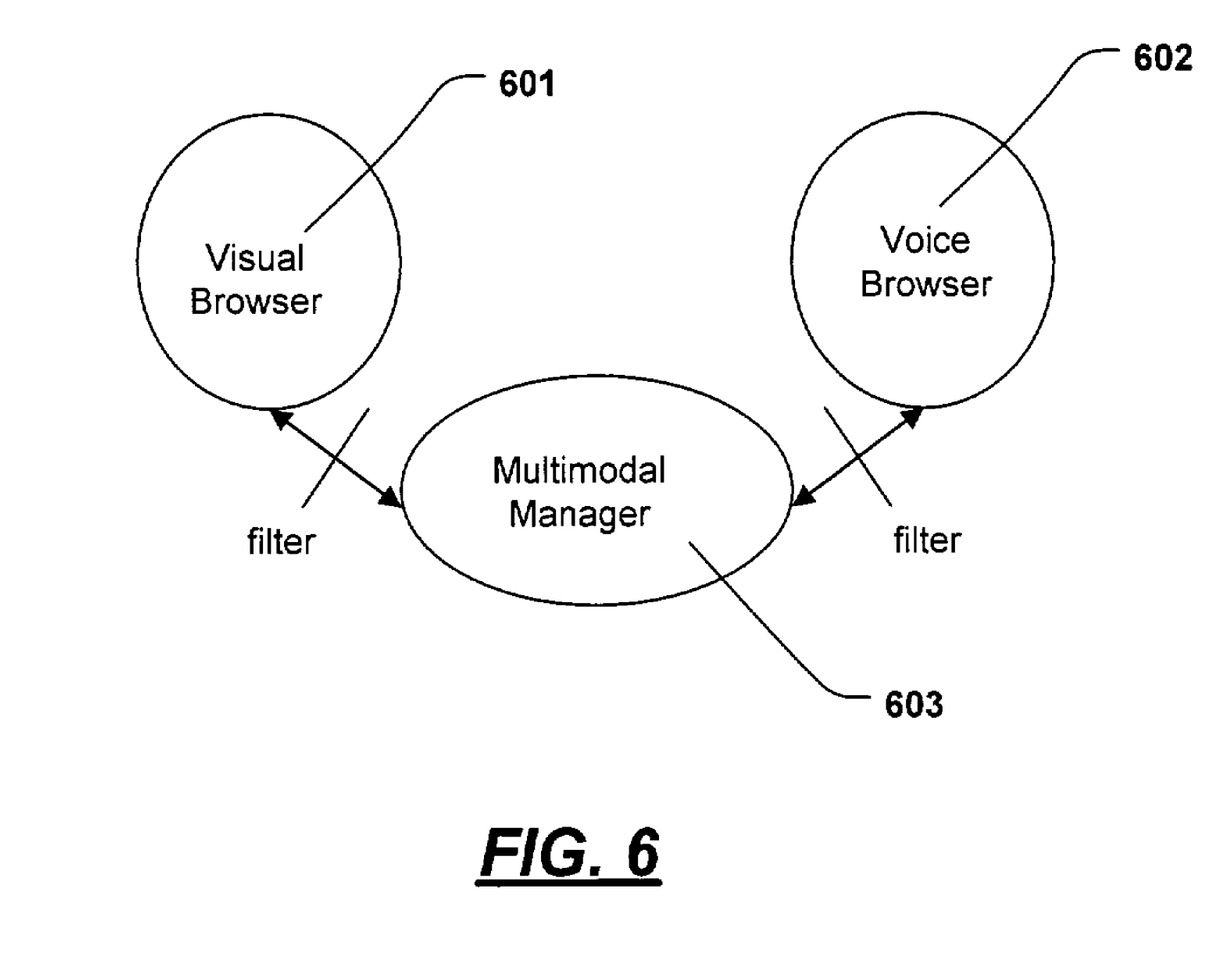
FIG. 6 is a block diagram of a second exemplary architecture according to aspects of the invention.
Figure 7:
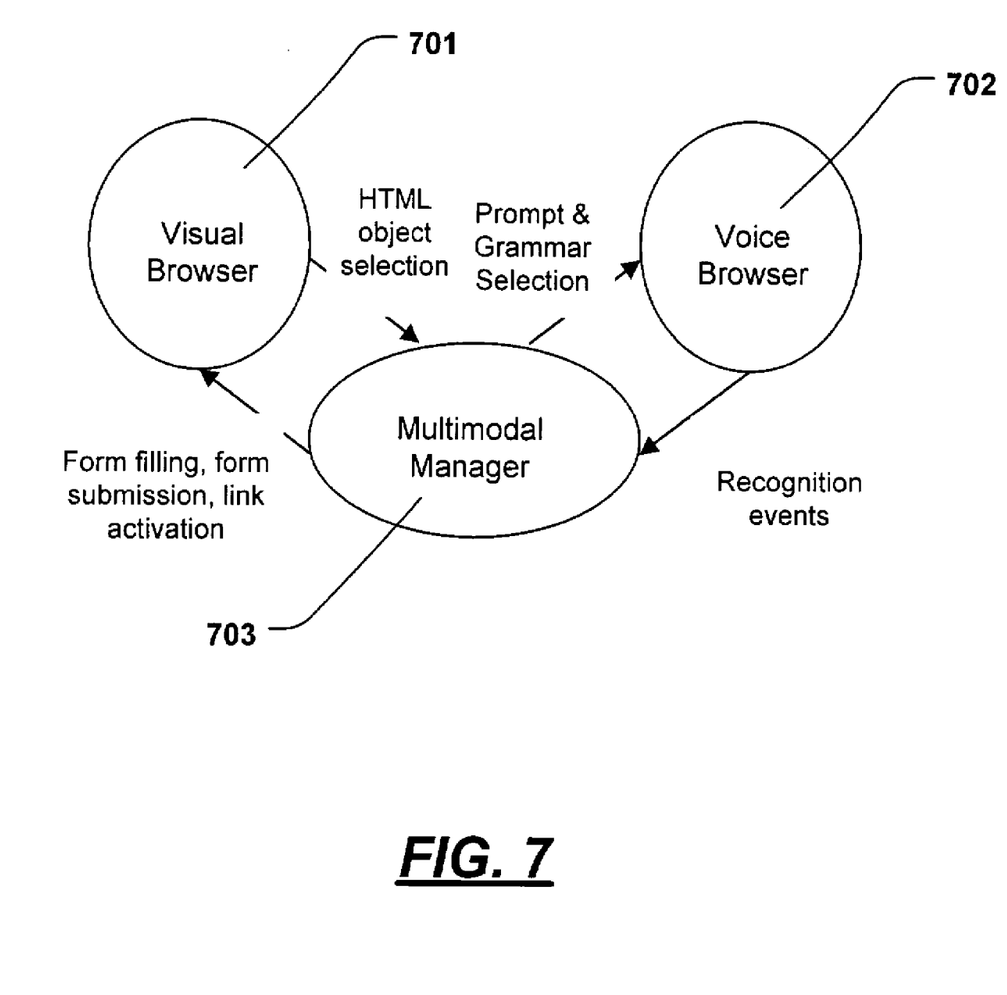
FIG. 7 is a block diagram of a third exemplary architecture according to aspects of the invention.

The material in the appendix, and the accompanying FIGS. 5–7, are Copyright 2001, Kirusa, Inc.

1. Functionality

The functionality of the system may be classified under the following heads: (1) multimodal features, (2) ease-of-use, and (3) application authoring. Some of this functionality is determined by the capabilities of the Visual Browser—the HTML Control module of an iPaq running PocketPC 2002; and by the capabilities of the Voice Browser—Speechworks' modified Open Speech Browser. Though both these entities have limitations, they have been chosen because they are still the least limiting as compared to the other choices that were available to us. We begin by describing their respective capabilities.

1.1. Capabilities of the Visual Browser

The client handheld is an iPaq running Pocket PC 2002/WinCE 3.x. It comes with an HTML Control module which can be used to build other HTML-browser based applications. This module is used by the Pocket Internet Explorer (PIE) that comes packaged with the handheld. We built the client-side of the prototype using the HTML Control module as this allows one to have a ready-made HTML viewer on the iPaq, with publicly available interfaces that are sufficiently rich so as to provide access to the major functions and APIs that are needed. The reason we use the HTML Control is because it gives us well-test commercial functionality, and saves us significant time and effort.

The publicly available interfaces to the HTML Control module provide access to major DOM events such as the activation of a hyperlink anchor, activating the submit button in an HTML form, and parsing events when a META tag is encountered in the HTML content. Other DOM events corresponding to various elements present in an HTML document cannot be accessed programmatically.

The DOM may however be manipulated by calling a procedure of the HTML Control module which effectively allows one to append a javascript command to the body of the document without needing the document to be reloaded. This, I turn, causes the module to update the DOM state, and as a result the visually rendered document. One may, for example, set the value of the field "editbox" of the first form in a document to, say, "Gladiator" by assigning the property value of the object document.forms[0].editbox to Gladiator. The javascript command that would be appended to update the value of the field editbox would thus look something like this:

<javascript>document.forms[0]
    .editbox.value="Gladiator"</javascript>

The above mechanism can thus be used to update the document state in the Visual Browser may be updated by an external entity, such as an external speech recognizer; despite the fact that programmatic access to the document state may be limited to external entities. The new 4.x WinCE OS release due in 2002, codenamed "Talisker," will provide much better access to the document state by allowing all the DOM events to be directly accessible.

1.2. Capabilities of the Voice Browser

The Voice Browser we use is a modified Open Speech Browser (OSB) from Speechworks. It is a standard VoiceXML 1.0 compliant Voice Browser, with an interface for packet voice, as well as the ability to pre-empt an ongoing session being executed by the OSB by initiating a "voice push." We use the term voice push to mean the ability of an entity external to the Voice Browser to submit the URL of a VoiceXML document to a specific port of the (modified) Voice Browser that would cause it to instantly fetch the new VoiceXML document and load it—thereby stopping execution and losing the context of the ongoing session. In the special case where the new URL is simply a relative anchor within the existing VoiceXML document, the push would simply result in the OSB jumping to that point in the exiting VoiceXML document.

Since we do not have access to any DOM events of such a Voice Browser we are even more limited than the Visual Browser in terms of what we can access or manipulate. Indeed recognition events may be trapped only in cases where the recognition results in a new VoiceXML page that is fetched by the Voice Browser via an HTTP request. Later in this document we will see how this asymmetry between the raw voice and visual browser abilities led to specific multimodal features and design choices.

1.3. Multimodal Features

The prototype implements hybrid multimodality which allows a user to simultaneously use the voice and visual channels/modes/interfaces to interact with the application. We use the term hybrid multimodality to depict this. Hybrid multimodality itself comes in several flavors, And the particular flavor used here is best described through the following set of features:

1. Support for seamless movement between (Hybrid) Multi-mode, Visual-only-mode, and Voice-only-mode by the user, provided the application supports it.

The content sent out by the application is always assumed to contain visual markup (HTML) with a META tag specifying a handle to VoiceXML content that is used to accompany the visual markup when the user has selected multimode (default), and another META tag specifying a handle to VoiceXML content that is to be used instead of the visual markup when the user has selected voice-only-mode.

The user may set the "mode preference" on the iPaq by choosing "visual off/on" or "voice off/on" on a menu provided on the client. The user may select this at any time.

The HTML for Visual-only-mode is the same as the HTML for Multi-mode. More precisely, the HTML for Multi-mode is the same as that for Visual-only-mode. The reason for this is that in practice we have found that the visual display of the iPaq is rich and large enough that in almost all situations reducing the HTML content when in multi-mode decreases the byte-size or for that matter the display area by only a negligible amount. This assumption may need to be revisited at a later time.

2. Visual input elements such as form fields, submit buttons, and hyperlinks of an HTML document in general have VoiceXML forms that correspond to some or all of these visual elements. These input elements can be filled/activated using speech when in multi-mode.

Fields in an HTML form are typically filled in using speech by clicking on an icon next to the HTML field. This informs the system that the prompt and grammar corresponding to that specific HTML field needs to be activated in the Voice Browser. This may be accomplished in many other ways as well. One may use a button instead of an icon instead. Ideally, once WinCE 4.x (Talisker) is available, this information can be trapped by simply listening for the "onFocus" DOM event when the user clicks inside the field itself.

The elements currently implemented and tested in the prototype are textfields, radiobuttons, submit buttons, and hyperlinks. One may also set other variable names embedded in client-side Javascript code within the HTML document which opens up a rich (albeit complex) set of possibilities.

3. Each multimodal "page" has a notion of a (default) global grammar which is used for activating hyperlinks and (at most) a single submit button. This is by default active, except when a specific HTML field is being filled in the case above.

These elements are activation elements and (of course) it doesn't make sense to select them visually, and then activate them using speech input. The single submit button restriction has to do with the situation where more than one HTML form is present in the HTML document. Note that given the display size of iPaqs it is rare to see more than one HTML form (possibly with multiple fields) in a page. One can get around the single submit button restriction if the submit buttons have unique text written on them (as opposed to "Submit"). The user's utterance can then be used to distinguish between the various (logical) submit buttons.

4. Instead of filling an HTML field by first clicking on the associated icon as described earlier, one may chose to unify the grammar corresponding to that HTML field into the global grammar.

This can be extended to all HTML fields, which would then make for a very slick user experience, since no icon clicks are required for filling HTML fields using speech. However, this solution requires the application author to take great care to avoid overloaded grammar slots. Such a unified grammar would also result in higher recognition errors, and this needs to be balanced with the benefit of not having to click icons when using voice to fill HTML fields in multi-mode.

1.4. Ease of Use

5. When the iPaq is ready to stream audio to the Speech Browser after the push-to-talk button has been pressed, a visual indicator appears on the screen. This provides a visual cue to the user as to when the user may start speaking without the fear of losing what is spoken.

The "push-to-talk" button is designed in a manner that sometimes makes it difficult to be certain on whether the button has been pressed or not. The visual indicator helps ascertain the status and ensure that no speech is lost. Currently, this is implemented by displaying a "red dot" on the top right corner of the screen to serve as a visual cue to the user.

6. Audio barge-in

This allows the user to barge-in both vocally as well as visually when a prompt is being played out by the speech browser. This is absolutely critical when the user needs to cut short a verbose voice prompt.

1.5. Application Authoring

7. Application markup is simple to author and debug.

The prototype is designed in such a fashion that the content sent out to the Visual Browser is regular HTML with multimodal-specific "http-equiv" META tags. If this content is to be rendered by a "regular" HTML browser these META tags will simply be ignored.

The second multimodal specific tag are the anchor tags that are activated when clicking the icons associated with HTML form fields. These anchors are relative anchors which do not point to any part of the document but are trapped by the multimodal client to enable multimodal functionality as explained earlier. A regular browser (such as Pocket IE) will simply ignore these relative anchors that point nowhere. Clicking them will result in a no-op.

The VoiceXML content has a special (static) header/trailer for enabling voice push which can be moved into an application root document. Much of the rest is plain VoiceXML, except for care that needs to be taken on ensuring that variable names pointed from VoiceXML to HTML objects and vice versa are accurate.

While not mandatory, we have used a single VoiceXML file that corresponds to a single HTML file. If voice-only-mode is to be supported then there are two VoiceXML files. Currently therefore there are two, possibly three, documents associated with each logical "multimodal page." One may choose to define a single physical "multimodal document" that fuses these documents into a single master document in an elementary fashion.

8. Existing Web applications may be multimodalized with relative ease and minor modifications.

Starting from a pure HTML-only application, one would need to simply add one or two META tags and additional anchor tags for icons associated with HTML form fields which are needed to activate local grammars specific to that HTML field.

This multimodalization may be automatable for many applications. One could insert tags to eth HTML as discussed earlier, and have the HTML drive the generation of the companion VoiceXML file(s) and the in-lined grammar—assuming this is feasible for the application.

2. Architecture

There are several alternate ways of implementing the functionality we discussed in the earlier section. We have designed the prototype so that it is logically structured in a manner that allows substantial flexibility and extensibility for adding additional multimodal features such as the notion of supporting "composite input." We begin with a high-level description of the architectural framework behind the design of this prototype. FIG. 5 is a schematic of the architecture which forms the basis for the design of the prototype A central component of the architecture is the notion of a Multimodal Manager (MMM) 501. The MMM, in general, receives events from both browsers and sends back resulting events to both browsers. These events are typically a result of user actions (such as a stylus click or an utterance), but may also be due to other events (such as a browser timeout). Not all browser events (or for that matter user actions) reach the MMM. Event Filters 502 filter events emanating from both browsers so that only events which are relevant for enabling multimodal functionality are sent to the multimodal manager.

The platform manager 503 and the client manager 504 start various processes and daemons and perform various networking and resource management functions.

The Visual browser is the HTML Control 505 and the Voice Browser is the OSB 506. Besides the event filters 502 and the MMM 501 which we have discussed, the other items are the HTTP Client 507 and the Recognizer 508. We will skip the Audio components for now since their record, playback and transport functions do not shed light on the multimodal aspects of the system. These will be discussed later in this document.

The HTTP Client is currently part of the HTML Control module. However its role is such that it should functionally be thought of as a utility of the Multimodal Manager.

The Recognizer is an HTTP daemon running on the platform. Its sole purpose is to trap recognition events by the OSB. Since the OSB is unable to provide direct access to recognition events we gain access to them via HTTP hits that are manifested as a result of a recognition event. These HTTP hits are incident on the Recognizer by design. The Recognizer extracts the recognized information embedded in the HTTP request and sends it back to the MMM. The Recognizer returns the equivalent of a logical no-op to the OSB. This is a roundabout way of trapping a DOM-level recognition event within the OSB.

2.1. Basic Operation

The architecture diagram of FIG. 5 shows a sample control flow depicting the operation of the overall system during a typical multi-mode session. The various steps are described below:
1. A user click on a hyperlink activates an event which is trapped by the client's event filter
2. The corresponding URL is ferried over to the MMM which then sends it to the HTTP Client
3. The HTTP Client sends out a GET request to the server for the URL document.
4. The HTTP Client obtains the response and parses the META http-equiv tags.
5. The HTTP Client sends the HTML document to the HTML Control
6. The HTTP Client sends the META http-equiv tags to the MMM
7. The MMM transports the (VXML) URL buried in the META tag to the platform which submits its to the platform's event filter
8. The (VXML) URL is pushed to the OSB
9. The OSB sends out a GET request to the server for the URL document.
10. The OSB obtains the VXML file and loads the document.
11. The OSB plays a prompt, prompting the user to provide speech input
12. The user makes an utterance
13. The OSB recognizes the speech which results in a GET request to the platform's Recognizer. The Recognizer traps the request and sends back a logical no-op response. As a side effect the Recognizer submits the recognized HTML object property and its value to the platform's event filter.
14. The platform's event filter ferries the event to the MMM
15. The MMM ferries this to the HTML event filter which then sets the HTML object property to the value.

In a situation where the user moves to voice-only-mode the Voice Browser is immediately instructed to load the voice-only (VXML) page by MMM as specified by the application author in the META http-equiv tag. As a result the visual display is also blanked out.

In a situation where the user moves to visual-only-mode, the audio output is disabled. Since speech input is implemented using push-to-talk, there is no explicit need to disable speech input. This also supports a scenario where the user may be willing to speak but not have the response played out aurally. Certain public settings may suit such a "half-duplex" voice-only-mode of operation.

2.2. Flexibility

One of the elegant aspects of the above architecture is that the MMM and the HTTP Client utility may be moved into the platform, thereby making the system more platform-centric. This would be aligned with Kirusa's strategic position of depending and deploying as little as possible on the client. The one drawback, though not overwhelming, in moving MMM to the platform is the additional delay involved since more of the work is being done remote to the user.

An intriguing possibility is to allow the flexibility of where the MMM functionality is resident—which may be determined at "run time." That is, we can envision a platform that has the capability of adaptively deactivating the MMM in the platform if the MMM functionality already exists in the client. This decision may be made either statically during client registration, or at run-time if the client's MMM capability can be expressed within HTTP request headers at the beginning of the multi-mode session.

2.3. Extensibility

The architecture also supports the following extensions:
1. Event filters can be used to vary the synchronization granularity or degree of modal coupling, as well as traffic on the air-link. This can be varied adaptively based on bandwidth availability etc.
2. The MMM can implement arbitrarily complex rules in the future. This would be valuable when implementing "composite input" as well as fancier state machines that could potentially adapt their behavior based on past observations of delays and/or errors.
3. The MMM may also allow sophisticated conflict resolution policies at a system-level. Further, these may be altered based on a variety of factors including round-trip delays and user behavior.

3. Multimodal Synchronization

Multimodal synchronization is accomplished by the multimodal manager 603 manipulating the state of the voice and visual browsers 601 and 602 based on voice or visual activity that it learns of from the respective browsers. FIG. 6 illustrates the abstract relationship between these various entities.

In general, one may choose to apply filters to events being submitted to the multimodal manager which ensures that energy and wireless link bandwidth is not wasted on unnecessary events. It also determines the desired level of "coupling" between the two browsers. Often, a more loosely coupled system may provide higher end-user satisfaction.

In our current prototype the problem in some sense is the reverse; we risk having access to too few events rather than too many! Indeed, both the visual browser (HTML Control) and the voice browser (OSB) do not provide us access to general DOM events. We have therefore chosen to generate these events by trapping HTTP hits that correspond to voice and visual activity. Since only those events that result in HTTP hits may be operated on by the multimodal manager, the functionality is limited as well.

This apparently awkward approach can still lead to interesting multimodal functionality. FIG. 7 shows the types of events that occur.

The visual browser 701 sends information about the HTML object currently in focus to the MMM 703. Since we do not have access to the "onFocus" event we substitute this by placing an icon which needs to be clicked to simulate the onFocus event. This results in the VoiceXM1 form/menu corresponding to that HTML object being activated on the Voice browser 702. The appropriate prompt and grammar are then activated. If the user's utterance results in a match the voice browser then makes a HTTP hit to an entity in the platform called the "Recognizer" which sends back a dummy/empty VoiceXML document to the Voice Browser, and as a side-effect ships the recognition event to the MMM. The MMM then operates on the recognition events and decides how these may be used to update the state of the HTML object in question. In general this involves either filling a field in a form, submitting a form, or activating a link.

3.1. Control Channel

In the prototype the MMM is located on the client. There is therefore need for a control channel to ferry multimodal events as messages across the air-link. This is accomplished by a persistent TCP connection between the client and platform. The TCP connection is setup by the client making a TCP request to the platform. Messages from the MMM on the client to the platform are a 2-tuple of the form <user-id><url>, while messages from the platform to the client are a 1-tuple of the form <urn> only. The <urn> sent is always null-terminated.

3.2. Voice Push

Messages received by the platform destined for the voice browser over the TCP control channel of the form <user-id><url>, need to result in the pre-emptive loading of the dialog corresponding to <urn> within the voice browser session associated with <user-id>. This is accomplished by sending a special UDP packet to the modified OSB which listens on a specific UDP socket. The binary format of the UDP packet needs to conform to the format specified by Speechworks' modified OSB:

| | |
|---|---|
| <0x00><0x00><seq><0x4200> | # 2+2+2+2 bytes |
| <0x04><0x00><x00> | # 4+2+2 bytes |
| <0x04><length(<url>)+1><user-id> | # 2+2+4 bytes |
| <url><0x0> | # length(<url>)+1 bytes |

The <seq> field provides an incremental counter to such UDP packets sent to the OSB. This allows the OSB to catch errors that may be corrected due to disordered delivery of UDP packets. The <user-id> field is a 4-byte string.

Since this voice push functionality is enabled by hacking the DTMF interface, all VoiceXML files that need to enable such functionality also need to add specific VoiceXML content.

4. Packet Voice Channel

The Packet Audio Channel is implemented as a persistent TCP connection between the client and the platform. Once the channel is initialized by the client connecting to the TCP daemon running on the platform and disclosing its <user-id> audio packets flow bi-directionally between the client and the platform. In addition to the audio packets, other messages that are sent on the audio channel include information on when the push-to-talk button is pushed/released, when the playback of the audio sent to the client begins/ends, and also information on the sample width of the PCM audio samples that are being sent across. The platform in turn connects to the OSB's TCP/IP Audio interface and relays these packets on to the modified OSB.

The packet voice channel is currently using 8-bit or 16-bit PCM-encoded speech. This is a bandwidth-intensive way of communicating over most air-links. Future prototypes will explore the use of DSR to alleviate this problem.

5. Multimodal Markup

The multimodal markup that is needed to author applications for the prototype comprises of an HTML document and a VoiceXML document. This allows application authors to use their existing knowledge to develop multi-modal applications. One may alternately fuse the HTML and VoiceXML documents into a single document as well in a fairly straight-forward fashion.

HTML Markup

1. The Visual browser uses standard HTML to display visual contents. There are two multimodal specific tags that are need to enable multi modality. A discussion on these follows:

When a new HTML page is loaded, the client looks for the following META tags in the document.

<meta http-equiv="vxml_url" content="http://somedomain.com/vxmldoc.vxml">

<meta http-equiv="voiceonly_url" content="http://somedomain.com/voiceonly.vxml">

Depending on the user's selected mode, the client sends the appropriate VoiceXML URL to the platform which in turn sends the URL to the speech browser. The speech browser then loads and executes the voiceXML document corresponding to the URL. The vxml_url is used when multimode has been selected, while the voiceonly_url is used when the voice-only-mode has been selected.

2. Fields in an HTML form are typically filled in using speech by clicking on an icon next to the HTML field. This icon has a link associated with it. This informs the system that the prompt and grammar corresponding to that specific HTML field needs to be activated in the Voice Browser. This link is a multimodal-specific link that is trapped by the client. The corresponding VXML form/menu that is associated with this HTML field is specified by what follows after #_kirusa_# in the relative link. The link #_kirusa_#CityFormName would thus be tied to a VoceXML form/menu whose id is CityFormName.

The source of an HTML page with these multimodal specific tags is shown below:

<HTML>
<HEAD>
<TITLE> Kirusa Movie Shop 2 </TITLE>
<META http-equiv="vxml_url"

content="http://kirusa.com/demo.vxml">
<META http-equiv="voiceonly_url content="http://kirusa.com/voiceonlydemo.vxml">
</HEAD>
</BODY>
This is a simple Kirusa form filling application </BR>
<A FORM METHOD=GET ACTION="http://kirusa.com/thank.html">
<A HREF="#_kirusa_#city-form"><img src="icon.gif"></A>
City Name: <INPUT NAME="city" TYPE=text value="City Name">
<a HREF="#_kirusa_#movie-form"><img src="icon.gif"></A>
Movie Name: <INPUT NAME="movie" TYPE=TEXT><BR>
<INPUT TYPE=SUBMIT VALUE=Submit>
</FORM>
</BODY>
</HTML>

Clicking on the icon would thus cause the appropriate relative link to be activated which the client will trap and use to activate the appropriate VoiceXML form/menu in the voice browser.

Note that the HTML page above can be rendered in any visual-only off-the-shelf HTML browser without any problems. The abvove tags will simply be ignored by the browser and the user will be able to interact with the page in a purely visual fashion as well.

VoiceXML Markup

In this prototype the voice browser is intended to eb a companion to the visual browser when the user is in multi-mode. The Voice browser is thus primarily used to play out the prompts and perform speech recognition, and thus behaves like a slave. On recognizing a certain utterance the Voice browser typically results one of the following actions:

Cause the client to navigate to a certain link on the current HTML page

Cause the client to set the value of a certain field on the currently displayed HTML form Cause the client to submit the currently display HTML form The mechanism used in this prototype is that upon recognition the Speech Browser fills out the values of the recognized variables and their names and submits them to the platform using and HTTP GET request.

The variables to be filled out for the above mentioned actions are as follows respectively:
1. _KIRUSA_LINK_NAVIGATE_This is set to the name of the link to be navigate on the HTML page
2. _KIRUSA_OBJECT_PROPERTY_, _KIRUSA_OBJECT_VALUE_These two variables contain the HTML form object property and object value to be set respectively.
3. _KIRUSA_SUBMIT_FORM_This variable is set the name of the HTML form to be submitted The syntax to define, set and submit the above mentioned variables in the Voice XML document is as follows:

Defining the variables:
<var name="_KIRUSA_LINK_NAVIGATE_"/>
<var name="_KIRUSA_OBJECT_PROPERTY_"/>
<var name="_KIRUSA_OBJECT_VALUE_"/>
<var name="_KIRUSA_SUBMIT_FORM_"/>

Setting the Variables:
<assign name="_KIRUSA_LINK_NAVIGATE_" expr="'LinkName'"/>
<assign name="_KIRUSA_OBJECT_PROPERTY_" expr="'document.forms[0].movie.value'"/>
<assign name="_KIRUSA_OBJECT_VALUE_" expr="'movie'"/>
<assign name="_KIRUSA_SUBMIT_FORM_" expr="'FormName'"/>

It is very important to remember that the values of the variables that correspond to the names of the HTML Objects must be identical to the names in the HTML form.

Submitting the variables:
<submit next="http://localhost/" namelist="_KIRUSA_LINK_NAVIGATE_"/>
<submit next="http://localhost/" namelist="_KIRUSA_OBJECT_PROPERTY___KIRUSA_OBJECT_VALUE_"/>
<submit next="http://localhost/" namelist="_KIRUSA_SUBMIT_FORM_"/>

The submission is being made to an HTTP daemon running on port 80 of the localhost. This is the Recognizer which returns a dummy/empty page in response, and sends the received request as a recognition event to the client.

The VoiceXML document may also have a special VoiceXML form/menu named kirusaglobal. This form/menu in the document is used to activate hyperlinks on the page or the Submit button in a HTML form. It may also be used to fill out HTML fields if the grammar associated with the field has been unified with the global grammar. When the client receives a recognition event from the platform, the MMM in the client instructs the speech browser to immediately activate the kirusaglobal form. This allows the global form to be active by default.

A sample VoiceXML document that fills out and submits an HTML form corresponding to the previous examples is as follows:
<?xml version="1.0"?>
<vxml version="1.0">
<!—HEADER START—>
<link next="#trigger">
<dtmf>*</dtmf>
</link>
<var name="_KIRUSA_OBJECT_PROPERTY_"/>
<var name="_KIRUSA_OBJECT_VALUE_"/>
<var name="_KIRUSA_SUBMIT_FORM_"/>
<!—HEADER END—>
<form>
<block>Welcome to Yahoo Movies. Please click the speaker icon to fill the respective field by speaking.
<goto next="#kirusaglobal"/>
</block>
</form>
<menu id="kirusaglobal">
<prompt timeout="20000">This is kirusa global</prompt>
<choice next="#formsubmit">Submit</choice>
<choice next="#formlink1">Home</choice>
<choice next="#formlink2">Google</choice>
<choice next="#formlink3">Websters</choice>
</menu>
<form id="formsubmit">
<block>
<prompt>You chose to submit the form</prompt>
<assign name="_KIRUSA_SUBMIT_FORM_" expr="'true'"/>
<submit next="http://localhost/" namelist="_KIRUSA_SUBMIT_FORM_"/>
</block>
</form>

```
<form id="movie-form">
<field name="movie">
<prompt timeout="200000">Please speak the movie
    name</prompt>
<option>Blade Runner</option>
<option>Star Wars</option>
<option>Philadelphia</option>
<filled>
<prompt>You chose the movie <value expr="movie"/></
    prompt>
<assign       name="_KIRUSA_OBJECT_PROPERTY_"
    expr="'document.forms[0].movie.value'"/>
<assign           name="_KIRUSA_OBJECT_VALUE_"
    expr="movie"/>
</filled>
</field>
<block>
<submit                      next="http://localhost/"
    namelist="_KIRUSA_OBJECT_PROPERTY__
    KIRUSA_OBJECT_VALUE_"/>
</block>
</form>
<form id="city-form">
<field name="city">
<prompt timeout="200000">Please speak the city name</
    prompt>
<option>Texas</option>
<option>Oklahoma</option>
<option>Philadelphia</option>
<filled>
<prompt>You chose the city <value expr="city"/></
    prompt>
<assign       name="_KIRUSA_OBJECT_PROPERTY_"
    expr="'document.forms[0]. city.value'"/>
<assign           name="_KIRUSA_OBJECT_VALUE_"
    expr="city"/>
</filled>
</field>
<block>
<submit                      next="http://localhost/"
    namelist="_KIRUSA_OBJECT_PROPERTY__
    KIRUSA_OBJECT_VALUE_"/>
</block>
</form>
<!--TRAILER START-->
<form id="trigger">
<object                              name="trigger"
    classid="com.speechworks.getTrigger"/>
<block>
<goto expr="trigger.URL"/>
</block>
</form>
<!--TRAILER END-->
</vxml>
```

6. Platform Implementation

The platform has been developed using Cygwin Perl. The platform is a multi-threaded program that runs several daemons, and maintains interfaces through sockets with a co-located modified OSB, and the remote client (iPaq). The platform also runs the recognizer which was discussed in the section on multimodal synchronization, and the voice push functionality discussed earlier.

After initialization, the following threads execute within the platform:

1. Thread to run the modified OSB.
2. Thread for handling TCP control channels for clients. This, in turn, forks off bidirectional handlers for each incoming connection (one per client). On receiving a message, each handler typically sends it out to the OSB's UDP port using a specific packet-format—usually causing a "voice push."
3. Thread for handling TCP packet voice channel for clients. This, in turn, forks off bidirectional handlers for each incoming connection (one per client). All I/O to/from a handler is effectively sent to/received from the TCP Audio interface of the OSB.
4. Thread for running the Recognizer. This is a HTTP daemon, which listens to incoming HTTP hits from the OSB, and returns a dummy VoiceXML document. It also writes the recognition event to the corresponding TCP control channel handler for that client—which transports the message out to the appropriate client.

7. Client Implementation

The client has been developed using Microsoft Embedded Visual C++ and uses the Pocket PC SDK. Major components of the client implemented in this prototype are:

1. Graphical User Interface (GUI)
2. Client Manager (and MMM)
3. Push-to-talk Button Handler
4. Audio Recorder
5. Audio Player
6. Control Channel
7. Packet Voice Channel
8. Logger
9. Registry Configuration Module Graphical User Interface (GUI)

The client is a Windows dialog-based application which uses different dialogs to interact with the user. There is a "main" dialog that renders HTML content using The HTML (View) Control provided with the Pocket PC SDK. The main dialog also displays the high level menus to get to the two other dialogs and to turn the Visual and Voice modes on/off. The other two dialogs are used to set the user preferences (home page, username etc.) and platform configuration parameters (IP address and ports etc.) The main dialog also displays a visual indication when the user presses the push-o-talk button to indicate that the Kirusa Client is ready to record speech.

Client Manager (and MMM)

The Client Manager's original responsibility is to initialize the different components of the client. However, in this prototype, it also serves the role of Multi Modal Manager (MMM) and the event filter. We intend to separate the multi modal functionality in a separate module in the future. Client Manager initializes the following components:

Html Control
Control Channels
Audio Recorder and Player
Push-to-talk Button

As part of the initialization, the client manager also creates the high level menus and instructs the HTML viewer to load the home page as specified by the user.

As the MMM and event filter, the client manager also listens for visual events arriving from the HTML control and recoignition events arriving from the platform via the control channel. The Client Manager parses the recognition event and takes the appropriate action which typically either results in the navigation to a new URL, setting the value of a form field, or submission of an HTML form.

The client manager also does book-keeping functions and cleans upon the shut down of the Client.

Push-to-Talk Button Handler

This handler runs as a separate thread in the Client process. Its sole purpose is to monitor push and release of the push-to-talk button. When it detects a button push, it notifies the audio player to stop playing the audio. The audio player then confirms that the audio has been stopped, and it informs the audio recorder to start recording the user utterance. Further, it also notifies the client manager to display the visual indicator that the client is ready to record.

The same process is repeated in the reverse order upon detection of the release of the push-to-talk button.

Audio Recorder

Upon detection of the push-to-talk button push, it prepares the memory buffers to record the user utterances from the wave input device of the IPAQ. As the buffers are filled with the recorded data, the audio recorder starts streaming the audio data to the platform via the packet voice channel. It also adds appropriate protocol messages as headers to the audio data packets.

As soon as the audio recorder is notified by the Push-to-talk handler that the record button has been released by the user, it stops the recording and streaming of the data. It then closes the handles to the Wave Input device.

Audio Player

The audio player assumes the responsibility of playing back the audio data streaming from the platform to the client. It does so by opening a wave out device on the IPAQ and decodes the audio data messages streaming from the server.

When the user chooses visual-only-mode or when the recording is in progress, the audio player is responsible for reading the streamed audio data from the voice channel and discarding it appropriately.

Control Channel

The control channel is implemented as a persistent TCP/IP link that is established between the client and the platform at the time of initialization. This link is used to send and receive the control messages to and from the platform. For example, it sends out the URLs or to be loaded by the speech browser and receives the recognition events from the platform, which are used to either (1) set the HTML field values (2) submit the form or (3) to navigate to a URL.

Packet Voice Channel

The Voice channel is a persistent TCP/IP links that is established with the Kirusa platform. Its only role is to stream the Audio data to and from the platform as per Speechworks' protocol.

Logger

The logger module is implemented as a singleton and has a global scope. It can be used by any of the other modules of the client to log activities to a log file. The logger module instantiates the log file, time stamps the information and keep tracks of a pre-defined number of user sessions. For example, in this prototype, it keeps the log files for last five user sessions.

Registry Configuration Module

The Registry Configuration Module is also implemented as a singleton and also has a global scope. It can be used by any of the other modules of the client software to retrieve or set the information in the device's registry. For example, the user preferences and platform configuration information are stored in the registry.

What is claimed:

1. A method of synchronizing a first browser and a second browser for a user wherein said first browser further comprises a multimodal manager, comprising the steps of:
    providing tags on a first content within a page of the first browser, wherein said tags perform the functions of,
        identifying a corresponding content within a page of the second browser that corresponds to the first content within the page of the first browser,
        containing a relative link to a non-existent label on the first content within the page of the first browser; and
        providing an instruction to jump to a non-existent relative link while the user browses the first content within the page of the first browser;
    receiving a request from said user, said request created by a user instruction to process the tags on the first content within the page, wherein said processing enables multimodal synchronization;
    applying a component object model object for,
        parsing content in the first content within the page of the first browser and arriving at a position within the first content within the page that is determined by said request received from said user;
        moving to the position of said non-existent label or non-existent relative link within the first content within the page, based on information contained in a tag at said arrived position; and
        invoking said multimodal manager to perform actions when the tag at said arrived position is encountered that points to the non-existing label or non-existent relative link, said actions of the multimodal manager further comprising;
            parsing a label within said encountered tag to which the component object model object is attempting to jump to; and
            using information contained in said label for sending information to the second browser indicative of the first browser's, and instructing the second browser to jump to a label on the corresponding content whereby the first browser and the second browser are synchronized.

2. The method of claim 1, wherein said first browser comprises a visual browser, and wherein said second browser comprises a voice browser.

3. The method of claim 1, wherein said first content within the page comprises an Hypertext Markup Language page.

4. The method of claim 1, wherein the information indicative of the first browser's state comprises a representation of a position at which a user is browsing in said first content item.

5. The method of claim 1, wherein said first content comprises an identifier of a second content that corresponds to said first content, said second content item being renderable on said second browser.

6. A computer-readable medium encoded with computer-executable instructions to perform the method of claim 1.

7. A system for communication, comprising:
    a computing device comprising a first browser;
    a multimodal platform comprising a second browser;
    a server in communication with said multimodal platform and said computing device, wherein said server provides content to said first browser and said second browser;
    wherein said content within a page of the first browser comprises tags, wherein said tags:

identify a corresponding content within a page of the second browser that corresponds to the first content within the page of the first browser;

contain a relative link to a non-existent label on the first content within the page of the first browser; and provide an instruction to jump to a non-existent relative link while the user browses the first content within the page of the first browser;

said first browser further comprising:

a multimodal manager;

a component object model object, wherein said component object model object:

parses the content in the first content within the page of the first browser and arriving at a position within the first content within the page that is determined by a request received from a user;

moves to the position of said non-existent label or non-existent relative link within the first content within the page, based on information contained in a tag at said arrived position; and invokes said multimodal manager to perform actions when the tag at said arrived position is encountered that points to the non-existent label or non-existent relative link, said actions of the multimodal manager further comprising;

parsing a label to said encountered tag to which the component object model object is attempting to jump to; and using the information contained in the label for sending information to the second browser indicative of the first browser's state, and instructing the second browser to jump to a label on the corresponding content whereby the first browser and the second browser are synchronized.

8. The system for synchronizing of claim 7, wherein said information indicative of said state of said first browser comprises information indicative of a position within said first content at which a user of said first browser is navigating.

9. The system of claim 7, wherein the control object model object is a hyper text mark-up language viewer.

10. The system of claim 7, further comprising event filters in the first and second browsers that only permit transmissions of events to the multimodal manager that are relevant for enabling multimodality functionality.

11. The system of claim 10, wherein event filters are used to vary the synchronization granurality of modal coupling.

* * * * *